(12) United States Patent
Li et al.

(10) Patent No.: US 12,145,281 B2
(45) Date of Patent: Nov. 19, 2024

(54) VISUAL POSITIONING METHOD AND SYSTEM BASED ON GAUSSIAN PROCESS, AND STORAGE MEDIUM

(71) Applicant: SHENZHEN UNIVERSITY, Guangdong (CN)

(72) Inventors: Jianqiang Li, Guangdong (CN); Jie Chen, Guangdong (CN); Qinjian Li, Guangdong (CN); Shuqing Hu, Guangdong (CN); Zhongming Liang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 348 days.

(21) Appl. No.: 17/666,550

(22) Filed: Feb. 7, 2022

(65) Prior Publication Data

US 2022/0168900 A1    Jun. 2, 2022

Related U.S. Application Data

(63) Continuation of application No. PCT/CN2020/127187, filed on Nov. 6, 2020.

(30) Foreign Application Priority Data

Jul. 27, 2020 (CN) .......................... 202010731969.1

(51) Int. Cl.
*B25J 9/16* (2006.01)
*G06N 7/01* (2023.01)
*G06V 10/42* (2022.01)

(52) U.S. Cl.
CPC ............. *B25J 9/1697* (2013.01); *B25J 9/163* (2013.01); *B25J 9/1664* (2013.01); *G06N 7/01* (2023.01); *G06V 10/42* (2022.01)

(58) Field of Classification Search
CPC ........ B25J 9/1697; B25J 9/163; B25J 9/1664; G06V 10/42; G06N 7/01
See application file for complete search history.

(56) References Cited

U.S. PATENT DOCUMENTS 11,040,729 B2 *   6/2021   Zhao ..................... B60W 50/00

FOREIGN PATENT DOCUMENTS

CN             110304075 A   *   10/2019   ........ B60W 50/0097

OTHER PUBLICATIONS

WIPO English translation of CN 110304075. (Year: 2019).*

* cited by examiner

*Primary Examiner* — Jason Holloway
*Assistant Examiner* — Christopher A Buksa (57) ABSTRACT

The present provides a visual positioning method and system based on a Gaussian process and a storage medium. The method includes: collecting image of surrounding environment and moving trajectory points while traveling (S100); extracting global features and semantic features from images (S200); processing the extracted global features and semantic features and the moving trajectory points according to a preset processing rule to obtain a Gaussian process observation model (S300); and reconstructing a Bayes filtering framework according to the Gaussian process observation model, endowing a current trajectory with an initial position point, and generating a next position point of the current trajectory, the next position point being used for providing a positioning guidance for navigation (S400). An association between a current state and a historical state can be established, so that the accuracy of a predicted next position point is improved, and accurate navigation can be provided for a robot motion.

9 Claims, 9 Drawing Sheets

Fig.1

(a) Unmanned vehicle  (b) Unmanned aerial vehicle (c) Original operating trajectory of unmanned vehicle  (d) Original operating trajectory of unmanned aerial vehicle

Fig. 2

| Method | Error | Uncertainty |
|---|---|---|
| blind motion | 14.5517 | 49.3515 |
| semantic feature | 6.9790 | 5.1970 |
| global visual feature | 2.6084 | 2.9365 |
| global visual and semantic feature | 2.4097 | 2.8950 |
| ORB-SLAM | 61.9367 | N.A. |

| Method | Error | Uncertainty |
|---|---|---|
| blind motion | 5.7250 | 3.5098 |
| semantic feature | 2.1508 | 0.8488 |
| global visual feature | 2.1130 | 1.1073 |
| global visual and semantic feature | 1.9085 | 1.0289 |
| ORB-SLAM | N.A. | N.A. |

Fig. 5

(a) blind motion  (b) semantic  (c) global visual  (d) global visual and semantic

```
┌─────────────────────────────────────────────────────────────┐
│ Substitute the Gaussian process observation model into a Bayes algorithm, │ ⟶ S410
│ construct an observation model of a Bayes framework by using the Gaussian │
│ process observation model, and reconstruct the Bayes framework │
└─────────────────────────────────────────────────────────────┘
                              ↓
┌─────────────────────────────────────────────────────────────┐
│ Endow a current trajectory with an initial position point, and predict a │ ⟶ S420
│ next position point of the current trajectory according to the initialition │
│ point in the reconstructed Bayes framework │
└─────────────────────────────────────────────────────────────┘
                              ↓
┌─────────────────────────────────────────────────────────────┐
│ Apply the observation model to the predicted next position point forposition │ ⟶ S430
│ correction to obtain a corrected predicted position point │
└─────────────────────────────────────────────────────────────┘
```

VISUAL POSITIONING METHOD AND SYSTEM BASED ON GAUSSIAN PROCESS, AND STORAGE MEDIUM

CROSS REFERENCE TO RELATED APPLICATIONS

The present application is a Continuation Application of PCT Application No. PCT/CN2020/127187 filed on Nov. 6, 2020, which claims the benefit of Chinese Patent Application No. 202010731969.1 filed on Jul. 27, 2020. All the above are hereby incorporated by reference in their entirety.

FIELD OF THE INVENTION

The present disclosure relates to the technical field of artificial intelligence positioning, and in particular, to a visual positioning method and system based on a Gaussian process, and a storage medium.

BACKGROUND OF THE INVENTION

Positioning is the basic problem of robot navigation. In an unknown environment, there is a large error in robot positioning. Therefore, a robot cannot be navigated according to own positioning of the robot. Therefore, the positioning of the robot needs to be optimized, and there are two main types of optimization frameworks:

The first type is an optimization framework based on a bundle adjustment method. Bundle adjustment is a set of mature visual positioning theory, which has the ability to optimize the whole trajectory, but easily loses the tracking of a moving trajectory of the robot, and there is a large positioning error when the robot is in an outdoor changing and noisy environment.

The other type is an optimization framework based on a filtering method, but this method can only estimate the latest state of the robot. However, a current state of the robot and a historical state are associated, so that if only the latest state of the robot is estimated without considering the historical state of the robot, the positioning accuracy will be inevitably reduced.

It can be seen that the above two main positioning optimization frameworks have the problem of poor positioning accuracy, and therefore, the prior art has defects which need to be improved and developed.

SUMMARY OF THE INVENTION

A technical problem to be solved by the present disclosure is to provide, aiming at the above defects in the prior art, a visual positioning method and system based on a Gaussian process, and a storage medium, intended to solve the problem of poor positioning accuracy of an optimization framework for optimizing robot positioning in the prior art.

A technical solution adopted to solve the technical problem of the present disclosure is as follows:

A visual positioning method based on a Gaussian process includes:

collecting image information of a surrounding environment and moving trajectory points while traveling;

extracting global features and semantic features in the collected image information;

processing the extracted global features and semantic features and the moving trajectory points according to a preset processing rule to obtain a Gaussian process observation model; and reconstructing a Bayes filtering framework according to the Gaussian process observation model, endowing a current trajectory with an initial position point, and generating a next position point of the current trajectory through the reconstructed Bayes filtering framework, the next position point being used for providing a positioning guidance for navigation.

By establishing a spatial association between global and semantic features and trajectory points, the accuracy of position point prediction by the reconstructed Bayes filtering framework can be improved.

Further, the reconstructing a B ayes filtering framework according to the Gaussian process observation model, endowing a current trajectory with an initial position point and generating a next position point of the current trajectory through the reconstructed Bayes filtering framework specifically includes:

substituting the Gaussian process observation model into a Bayes algorithm, constructing an observation model of a Bayes filtering framework by using the Gaussian process observation model, and reconstructing the Bayes filtering framework;

endowing a current trajectory with an initial position point, and predicting a next position point of the current trajectory according to the initial position point in the reconstructed Bayes filtering framework; and applying the observation model to the predicted next position point for position correction to obtain a corrected predicted position point.

Further, after the applying the observation model to the predicted next position point for position correction to obtain a corrected predicted position point, the method includes:

continuing to predict a next position point with the corrected predicted position point as a current position point.

By continuously correcting a position point and predicting a next position point, a complete trajectory can be obtained, which is beneficial to providing navigation for a robot.

Further, the manners of extracting global features and semantic features in the collected image information respectively are:

extracting dimensions of global features in the collected image information through a Steerable Pyramid algorithm; and extracting a maximum probability value of different categories of things in each collected picture through CenterNet algorithm semantics.

Further, the processing the extracted global features and semantic features and the moving trajectory points according to a preset processing rule to obtain a Gaussian process observation model specifically includes:

compressing the extracted dimensions of the global features to non-repetitive minimum dimensions;

establishing a dimension for the maximum probability value of semantic extraction according to categories of things respectively;

combining the dimensions corresponding to the extracted global features and semantic features into an eigenvalue matrix; and establishing and training a corresponding relationship between the eigenvalue matrix and collected trajectory points, and outputting the Gaussian process observation model representing a spatial relationship between eigenvalues and trajectory points.

Through the high-dimensional processing of global and semantic features, processing results can be applied to a Gaussian process, which is beneficial to Gaussian modeling.

Further, the establishing and training a corresponding relationship between the eigenvalue matrix and collected trajectory points and outputting the Gaussian process observation model representing a spatial relationship between eigenvalues and trajectory points specifically includes:

training a Gaussian process by taking a trajectory point as an X value and an eigenvalue as a Y value, and establishing a relationship between the eigenvalue and the trajectory point to obtain a Gaussian process observation model.

Further, the collecting image information of a surrounding environment and moving trajectory points while traveling specifically includes:

enabling a camera to take an image of the surrounding environment while traveling; and positioning trajectory points moving while traveling by a GPS, and randomly collecting the trajectory points positioned by the GPS.

A camera is used for shooting, which can ensure the maximum image information and improve the recognition rate of a surrounding environment while reducing the cost.

Further, the initial position point of the current trajectory is a first position point of the current trajectory positioned by the GPS.

The present disclosure also discloses a system, including a memory, and one or more programs. The one or more programs are stored in the memory and configured to be executed by one or more processors to perform the visual positioning method based on the Gaussian process described above.

The present disclosure also discloses a storage medium, storing a computer program that can be executed for implementing the visual positioning method based on the Gaussian process described above.

The present disclosure provides a visual positioning method and system based on a Gaussian process, and a storage medium. The method includes: collecting image information of a surrounding environment and moving trajectory points while traveling;

extracting global features and semantic features in the collected image information; processing the extracted global features and semantic features and the moving trajectory points according to a preset processing rule to obtain a Gaussian process observation model; and reconstructing a Bayes filtering framework according to the Gaussian process observation model, endowing a current trajectory with an initial position point, and generating a next position point of the current trajectory through the reconstructed Bayes filtering framework. An association between a current state and a historical state can be established, so that the accuracy of a predicted next position point is improved, and accurate navigation can be provided for a robot motion.

DETAILED DESCRIPTION OF THE EMBODIMENTS

In order to make the objects, technical solutions and advantages of the present disclosure clearer, the present disclosure will be further described in detail below with reference to the accompanying drawings and embodiments. It should be understood that the specific embodiments described herein are illustrative only and are not intended to limit the present disclosure.

Simultaneous Localization and Mapping (SLAM) is one of the current popular research directions of artificial intelligence. The SLAM problem may be described as: a robot moves from an unknown position in an unknown environment. In the moving process, the robot is positioned according to position estimation and mapping. Meanwhile, an incremental map is built on the basis of self-positioning to realize the autonomous positioning and navigation of the robot.

However, the SLAM algorithm only considers how the robot uses obtained information to construct a map of the environment and position the robot in the map, and does not consider how the robot effectively detects the unknown environment, so that the SLAM algorithm cannot be used for path planning of the robot.

Therefore, an ORBSLAM algorithm is developed on the basis of the above SLAM algorithm. ORBSLAM is a real-time monocular SLAM system based on feature points, which may operate in a large-scale, small-scale and indoor/outdoor environment, and includes the following modules: tracking, mapping and loop closing. The principle is as follows: a pose may be optimized by extracting ORB features from an image, performing pose estimation from a previous frame, or initializing the pose through global repositioning and then tracking a local map already reconstructed. However, an ORBSLAM system still suffers from large errors due to various different noises in the outdoor environment.

Based on the above algorithm, the positioning of the robot also needs to be optimized. There are two main optimization frameworks for robot positioning. The first type of optimization framework is based on Bundle Adjustment (BA), which is also an optimization method used by ORBSLAM. Bundle adjustment is a set of mature visual positioning theory, which has the ability to optimize the whole trajectory. However, since adjacent features in an image need to be matched, the trajectory may not be tracked in the case of rotation, initialization and illumination changes. Therefore, it relies heavily on image data and it is assumed that the trajectory is smooth. There may be more positioning errors for outdoor changing and noisy environments. When ORBSLAM is used for outdoor robot positioning, feature points are often lost and the trajectory is missing, even positioning information is lost.

The other type of optimization framework is a filtering method, which is computationally efficient but only estimates the latest robot pose. A Bayes filter uses a motion model to estimate the trajectory and uses an observation model to correct errors. When a current position of the robot is given, the observation model usually has Markov property, and has a current measurement value conditionally independent of the past measurement value. Since the environment has a spatially dependent structure, the positioning performance of the robot is greatly reduced.

It can be seen that the above two commonly used robot positioning optimization frameworks also have disadvantages in specific applications. If the robot position prediction is not accurate enough, there will be certain errors, which may also be accumulated, thereby leading to a great deviation between a subsequently predicted operating trajectory and an actual trajectory. Thus, the present disclosure makes improvements upon the existing positioning optimization framework for inaccurate positioning to achieve precise positioning of the robot in the unknown environment.

Figure 1:
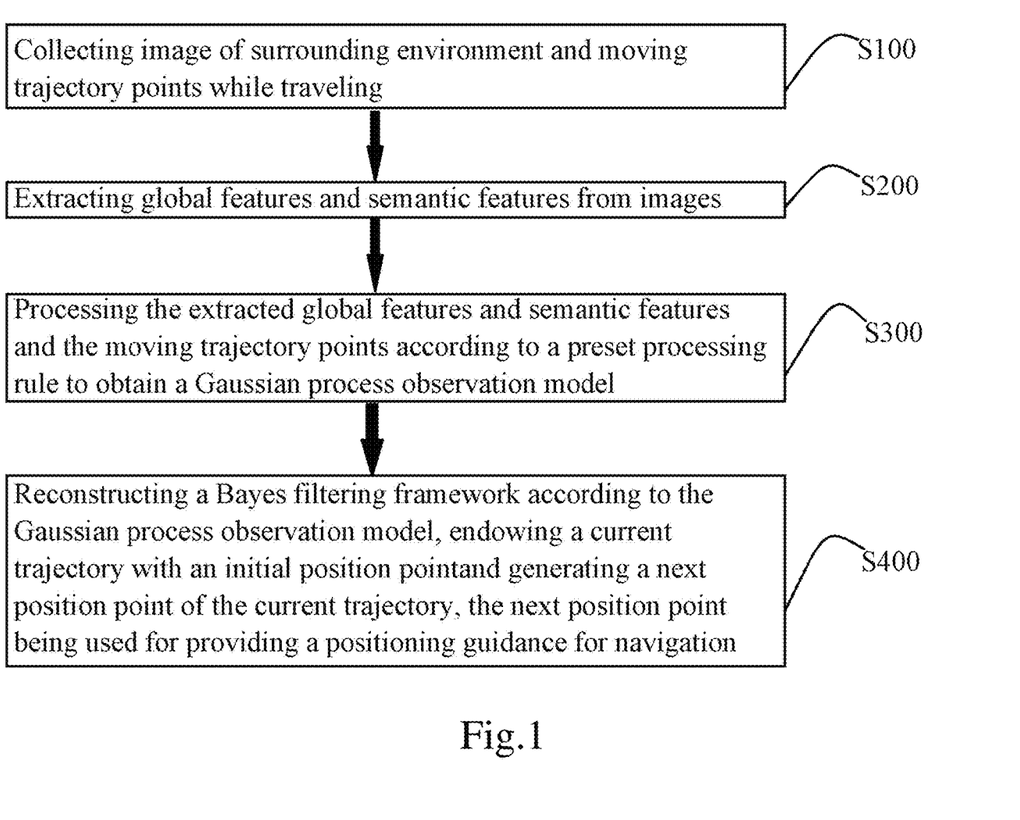
FIG. 1 is a flowchart of a preferred embodiment of a visual positioning method based on a Gaussian process in the present disclosure.

The technical solution of the present disclosure is as follows:

Referring to FIG. 1, FIG. 1 is a flowchart of a visual positioning method based on a Gaussian process in the present disclosure. As shown in FIG. 1, a visual positioning method based on a Gaussian process according to an embodiment of the present disclosure includes the following steps.

At S100, image information of a surrounding environment and moving trajectory points while traveling are collected.

There are various modes for collecting image information, which may be shot by a camera or detected by a laser radar. The above two modes can be more accurate during outdoor environment detection.

The laser radar is a radar system that detects a characteristic quantity such as a position and a speed of a target by emitting a laser beam. The working principle is as follows. A detection signal (laser beam) is emitted to a target, a received signal (target echo) reflected from the target is compared with the emitted signal, and after appropriate processing, relevant information about the target may be obtained, such as target distance, orientation, height, speed, attitude, even shape, and other parameters, so as to detect, trajectory and identify an aircraft, a missile and other targets. Laser radar ranging has the characteristics of long detection distance, high measurement precision and high angular resolution, which can accurately sense the surrounding environment. However, due to its high cost, the cost of robots will be increased, which is not beneficial to commercial promotion.

Thus, in this application, a camera is used to sense the surrounding environment. The camera is cheaper than a laser radar, and can be widely used, which is beneficial to robot technology development. Visual information obtained by the camera contains rich structural information, which is beneficial to mapping and semantic information extraction.

In a further specific embodiment, collecting image information of a surrounding environment while traveling includes: enabling a camera to take an image of the surrounding environment while traveling. Specifically, the structure of the robot may be modified with the camera mounted in the robot, or the structure of the robot may be not modified, but a mode of mounting a vehicle-mounted camera on the robot is adopted, or an aircraft is adopted for taking simultaneous shots, or the camera and the robot synchronously travel in other manners to shoot the surrounding environment of the robot. It will be understood that there are various modes of shooting the surrounding environment of the robot while traveling by using the camera, an example will not be given here, and any mode of simultaneously shooting the surrounding environment of the robot can be used in the present embodiment.

In a further specific embodiment, the mode of collecting moving trajectory points while traveling is: positioning trajectory points moving while traveling by a GPS, and randomly collecting the trajectory points positioned by the GPS. Specifically, a sensing device is mounted on the robot, so that real trajectory points of a robot motion can be accurately positioned, and random sampling is performed in the real trajectory points.

At S200, global features and semantic features in the collected image information are extracted.

At present, outdoor mobile robot visual positioning systems mainly include an ORBSLAM system and a VINS system. Both the systems use a local feature as an observation value to demonstrate the observation of an image at the moment. The local feature refers to a feature extracted from a local region of the image, including an edge, a corner, a line, a curve, a region of a special attribute, etc. In view of a local feature as an observation value, if local features in multi-frame images are to be matched, it is required that the positioning is more accurate as the matching accuracy is higher, and more local features are required to be extracted correspondingly. Therefore, the amount of calculation will also increase with the matching accuracy, which is not beneficial to matching the local features.

Figure 2:
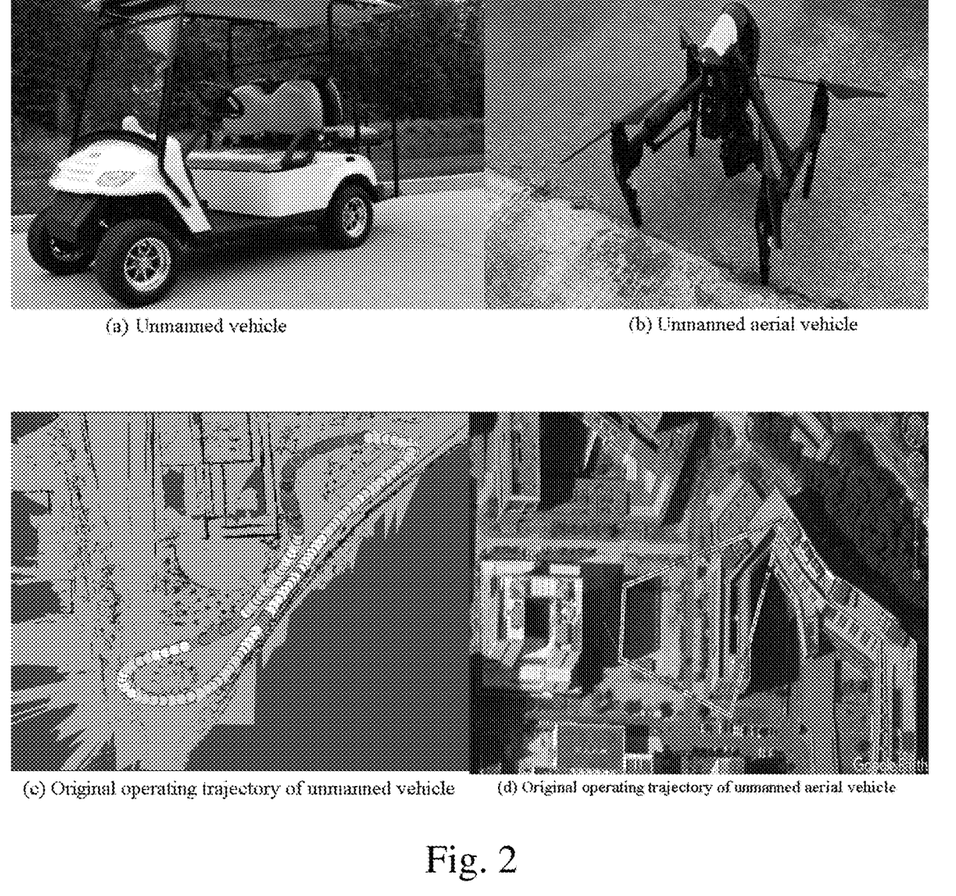
FIG. 2 is a schematic diagram of an original trajectory of an unmanned vehicle and an unmanned aerial vehicle when operating in an unknown environment in the prior art.
Figure 4:
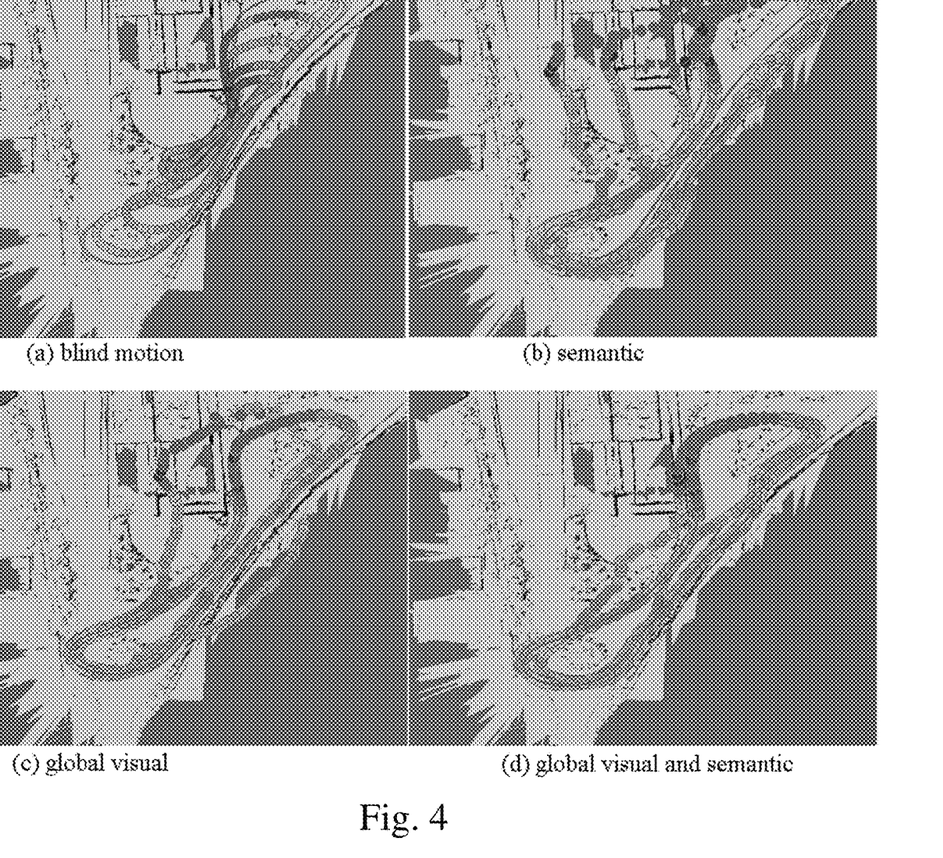
FIG. 4 is a schematic diagram of an operation trajectory of an unmanned vehicle in the present disclosure.
Figure 6:
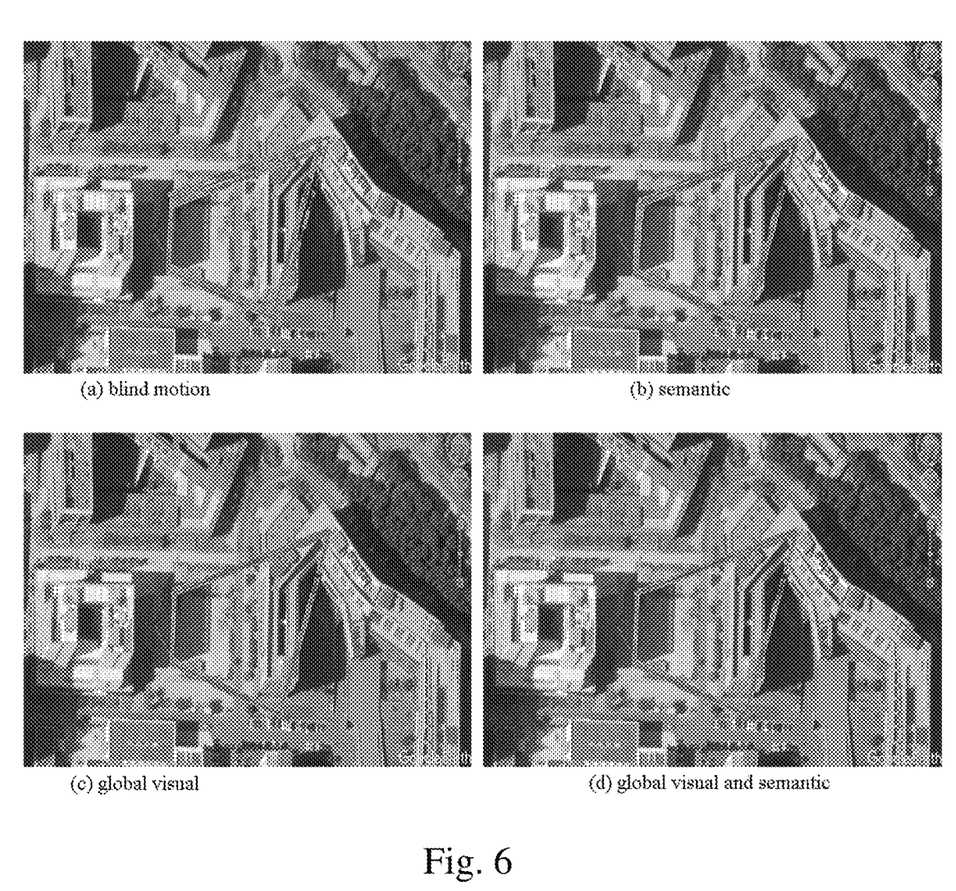
FIG. 6 is a schematic diagram of an operation trajectory of an unmanned aerial vehicle in the present disclosure.

As shown in FIGS. 2, 4 and 6, comparison diagrams of a predicted trajectory in the prior art and a predicted trajectory in the present disclosure are shown. FIG. 2 is a schematic diagram of an unmanned vehicle (a) (golf cart) and an unmanned aerial vehicle (b) (UAV) operating respectively in an unknown environment in the prior art. An original operating trajectory of the unmanned vehicle (a) is (c) (ground truth of golf cart), and an original operating trajectory of the unmanned aerial vehicle (b) is (d) (ground truth of UAV).

Figure 3:
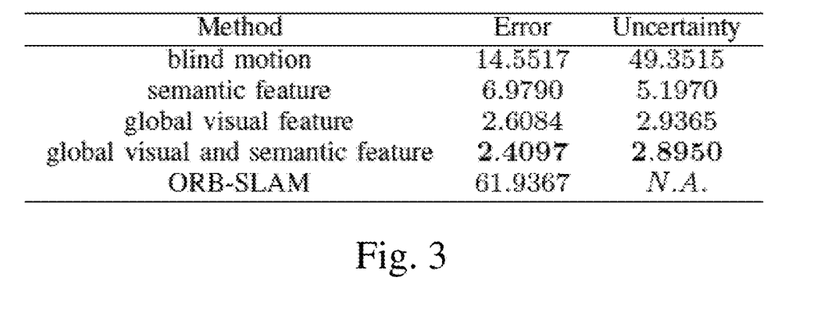
FIG. 3 is a schematic numerical diagram of an operation result of an unmanned vehicle in the present disclosure.
Figure 5:
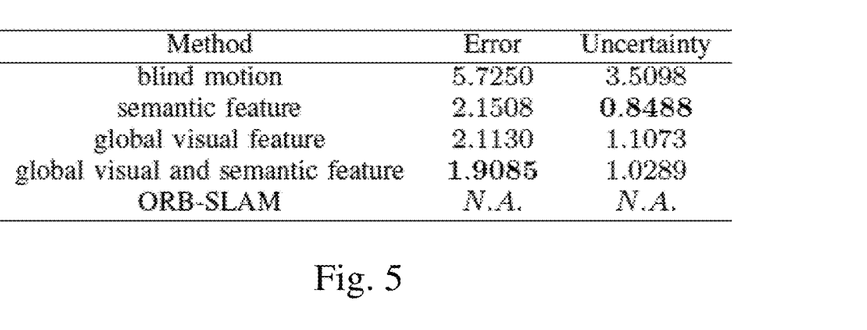
FIG. 5 is a schematic numerical diagram of an operation result of an unmanned aerial vehicle in the present disclosure.

However, a series of parameters are set in the present disclosure, and experimental results obtained are shown in FIGS. 3 to 6. FIG. 3 is a numerical value of an experimental result of an unmanned vehicle, and FIG. 4 is a graphical representation of the experimental result of the unmanned vehicle correspondingly. FIG. 5 is a numerical value of an experimental result of an unmanned aerial vehicle, and FIG. 6 is a graphical representation of the experimental result of the unmanned aerial vehicle correspondingly. (a) (blind motion) is operating in an unknown environment, (b) (semantic) is extracting semantic features, (c) (global visual) is extracting visual features, and (d) (global visual and semantic) is combining semantic features and visual features.

By comparing the above experimental results, it can be seen that in this application, by extracting semantic features and global features and combining with a Gaussian process, a current trajectory position point is continuously predicted, and the predicted position point is corrected to obtain an operating trajectory that is greatly different from the experimental result of not extracting semantic features and global features in the prior art and directly using B ayes filtering. Meanwhile, the prediction accuracy of position points using the method in the present disclosure is also demonstrated.

This application uses a global feature as an observation value. The global feature refers to an overall attribute of an image, and common global features include a color feature, a texture feature, a shape feature, etc. such as an intensity histogram. The global feature has the characteristics of good invariance, simple calculation, intuitive representation, etc. An association between adjacent positions may be better represented.

In a specific embodiment, the mode of extracting a global feature as an observation value is: extracting dimensions of global features in the collected image information through a Steerable Pyramid algorithm. The Steerable Pyramid algorithm is used to decompose an image into sub-band information with different scales and different directions, and through the decomposed sub-band image, desired features may be observed in different scales and different directions.

Meanwhile, this application also combines a semantic feature as an observation value, the semantic feature is also a feature expression mode continuously developed with the development of in-depth learning in recent years, and semantics can often assist in better understanding an image, and can make the positioning of a robot more intelligent. Meanwhile, the association of semantic information between adjacent positions is also great.

In a specific embodiment, the mode of extracting a semantic feature as an observation value is: extracting a maximum probability value of different categories of things in each collected picture through CenterNet algorithm semantics. Specifically, things on each picture are classified, and the probability value of finding the identifiable things of the same category is the highest. The positions of an upper left corner point and a lower right corner point are predicted based on the CenterNet algorithm. Two heatmap (two foot points), offset (mapping from a heatmap to an original map), and embedding (whether the two foot points are the same object) are predicted each time.

Figure 7:
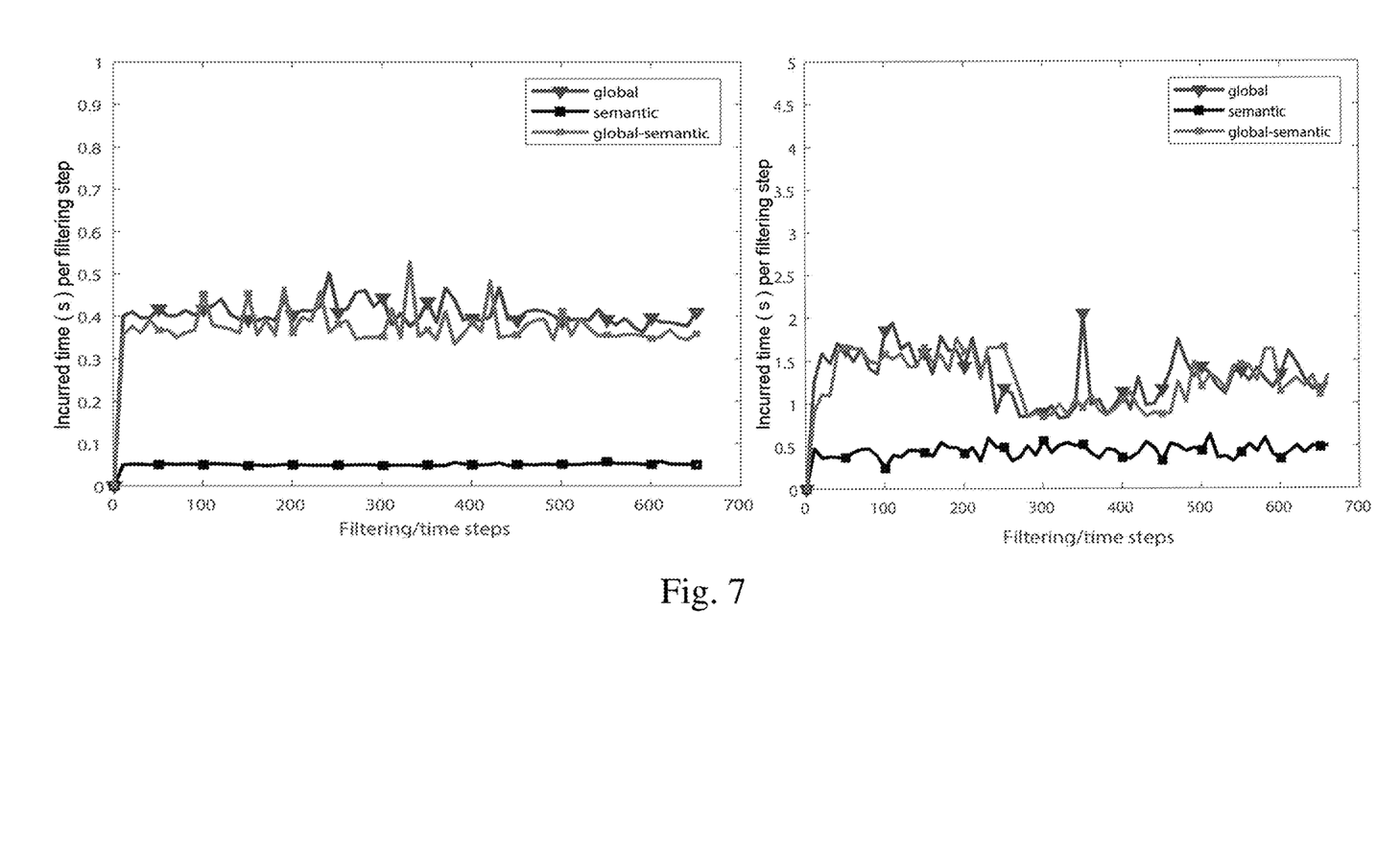
FIG. 7 is a comparison diagram of filtering effects on different features in the present disclosure.

It should be noted here that if only one of the semantic and global features is extracted, the best positioning effect cannot be achieved. As shown in FIGS. 4 and 6, because less categories of semantic information are extracted and information used for positioning is not sufficient, final errors are relatively high, and a better effect can be achieved by combining the global feature. In contrast, since the semantic information occupies less, the accuracy is worse than that of the global feature and the local feature, but the filtering speed is higher. As shown in FIG. 7, a single line represents the semantic feature, and a double line represents the global feature. In an experimental process, different devices are adopted, which are, for example, an unmanned vehicle and an unmanned aerial vehicle for collecting semantic and global features respectively. The filtering speed of the semantic feature is obviously high when filtering. By combining the global and semantic features, less time is consumed in the filtering process while maintaining optimal accuracy, so it is very suitable for outdoor real-time robot positioning systems.

By extracting the global feature and the semantic feature in image information respectively, the limitation of large amount of calculation required to extract the local feature as an observation value can be overcome, and both the global feature and the semantic feature can well express an association between adjacent positions, and can well express an association between a current motion state and a historical motion state, which is beneficial to improving the accuracy of positioning. In addition, extracting semantic information is also beneficial to the future semantic segmentation and semantic information extraction, thereby making a positioning system more intelligent.

At S300, the extracted global features and semantic features and the moving trajectory points are processed according to a preset processing rule to obtain a Gaussian process observation model.

The Gaussian process (GP) refers to that a random process is called a Gaussian process or a normal process if finite dimensions are normally distributed.

By taking the extracted global and semantic features as observation values, a spatial structure relationship between the observation values and trajectory points is established, and a relationship between the current state and historical state of the robot can be established. There is a large association between adjacent positions represented by the global feature and the semantic feature, which is beneficial to constructing a Gaussian process and then forming a normal distribution between the observation values and the randomly sampled trajectory points.

Figure 8:
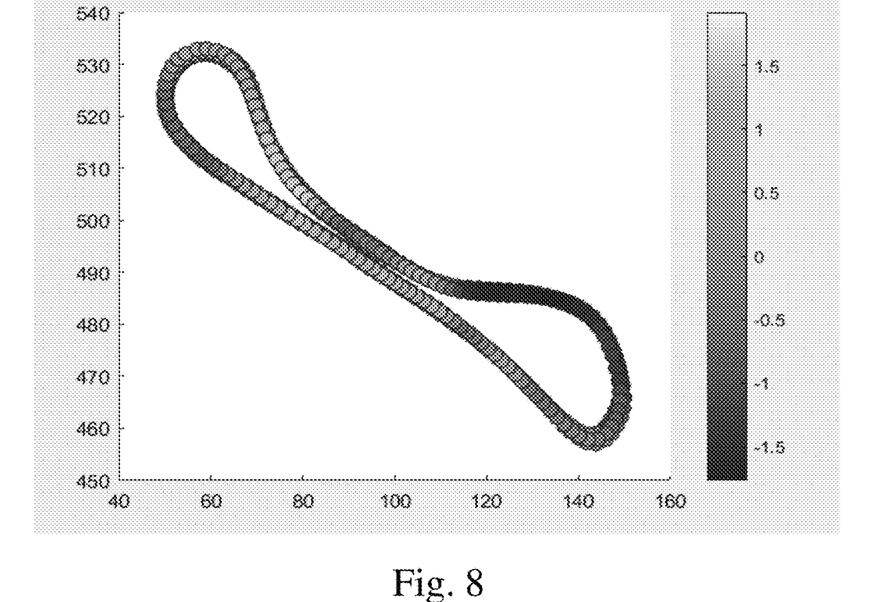
FIG. 8 is a schematic diagram of a preferred embodiment of numeralizing an observation value in the present disclosure.

Further, the above selection of the observation value and the processing procedure of the observation value may be processed off line. Specifically, the observation value is numeralized. With reference to FIG. 8, by processing the observation value off line, the system operating speed can be improved without occupying the system memory.

Figure 9:
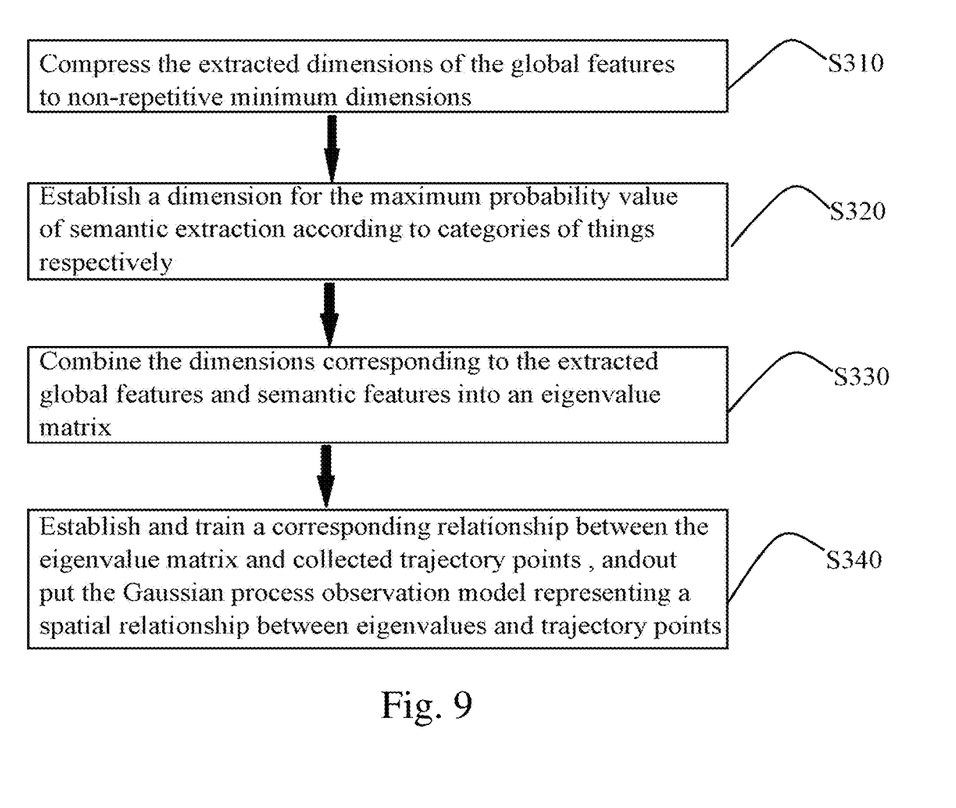
FIG. 9 is a flowchart of a preferred embodiment of a mode of processing global features, semantic features and randomly adopted trajectory points in step S300 of FIG. 1.

In a specific embodiment, as shown in FIG. 9, the mode of processing global features, semantic features and randomly adopted trajectory points specifically includes the following steps.

At S310, the extracted dimensions of the global features are compressed to non-repetitive minimum dimensions.

Specifically, global features in an image are extracted by an open source Steerable Pyramid algorithm, and are compressed here with experimental data: after extracting the global features, global features of 72 dimensions are extracted, but 4*18 dimensions in the 72 dimensions are cyclically repeated. Thus, the original 72-dimension global features are compressed into non-repetitive 18-dimension global features.

At S320, a dimension is established for the maximum probability value of semantic extraction according to categories of things respectively.

Specifically, the highest probability value of each identifiable category in each picture is extracted as an observation value. For example, a single category in each picture has only one probability value, and therefore only one probability value of the category is extracted as an observation value. If there are multiple objects in the same category in each picture, the probability value of an object with the highest identification probability in the same category in different pictures is extracted as an observation value. Then, each extracted category is taken as a dimension to complete processing of the semantic features.

At S330, the dimensions corresponding to the extracted global features and semantic features are combined into an eigenvalue matrix. The dimension of a row represents a feature category in the global features or a category of a thing in the semantic features. The dimension of a column represents an estimation point or each frame of picture.

Specifically, a code is processed by using matlab to form a matrix form. The formed eigenvalue matrix is taken as an N*18 matrix, and current trajectory points form an N*3 matrix. N represents the number of pictures/positions.

At S340, a corresponding relationship between the eigenvalue matrix and collected trajectory points is established and trained, and the Gaussian process observation model representing a spatial relationship between eigenvalues and trajectory points is output.

Specifically, a trajectory point is taken as an X value and an observation value is taken as a Y value. The observation value is an eigenvalue value after combining a semantic feature and a global feature. By performing Gaussian process training on the observation value and the trajectory point, a series of covariance functions and mean square errors (including a kernel function) representing a correlation between spatial structures may be obtained as an expression of the Gaussian process, which is called a GP Model. By training the Gaussian process, the relationship between each trajectory point and the observation value can be obtained. That is, knowing a current observation value, the position of a current trajectory point corresponding to the current observation value may be calculated by a trained model, and this calculation process is represented by a Gaussian kernel function.

It will be understood that the Gaussian process is trained through real sampled trajectory points and eigenvalues, in order to establish a relationship between the trajectory points and the observation values. Therefore, only one sampling is needed, and the trajectory points are randomly sampled for one Gaussian process training, so as to obtain a model, which may be used in similar scenes, thereby reducing the need for frequent modeling and saving data processing flows.

At S400, a Bayes filtering framework is reconstructed according to the Gaussian process observation model, a current trajectory is endowed with an initial position point, and a next position point of the current trajectory is generated through the reconstructed Bayes filtering framework. The next position point is used for providing a positioning guidance for navigation.

Figure 11:
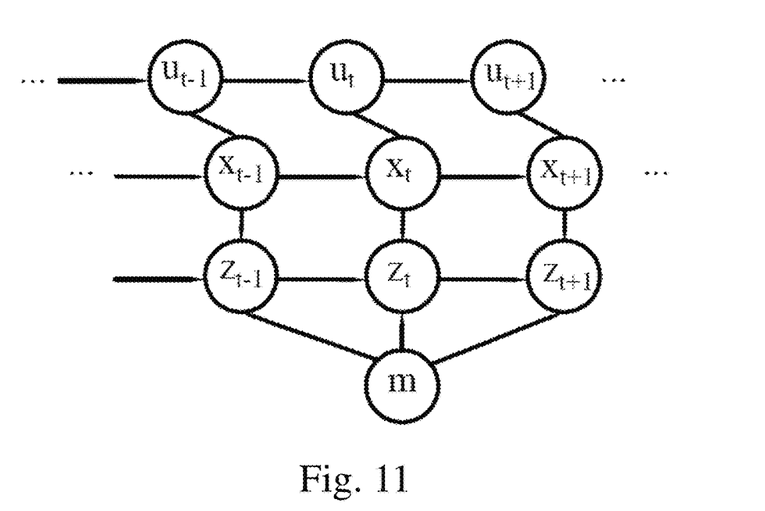
FIG. 11 is a conventional Bayes filtering framework.

The principle of Bayes filtering is to estimate the pose of a robot according to a probability state. Specifically, a Bayes filter is a probability state estimation framework, as shown in FIG. 11. FIG. 11 is a conventional Bayes filtering framework. By adjusting control actions and on-site measurements performed by the robot, beliefs about the position/state of the robot are repeatedly updated. After the robot performs a series of control actions, some observation values and corresponding control information are obtained by the robot, and then the current position of the robot may be estimated by calculating a probability distribution, which is called a probability value (belief) of the belief to be calculated. The framework of Bayes filtering is composed of a motion model and an observation model. Generally, a Bayes filtering process is divided into two steps, that is, estimating a position through the motion model and correcting the estimated position through the observation model.

There is a Markov hypothesis in the observation model of Bayes filtering, that is, the current observation values are not related to the past observations and control information of the robot, but only to the current state. This hypothesis does not make full use of historical data on the robot trajectory, ignores the importance of the historical data for estimating the current position of the robot, and further reduces the positioning performance of the robot to some extent.

Figure 12:
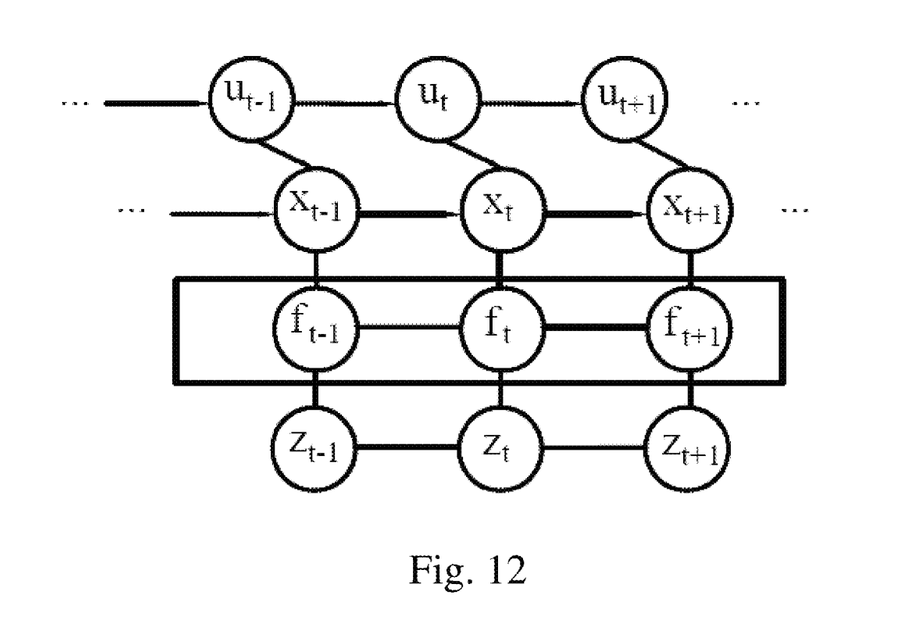
FIG. 12 is a Bayes filtering framework after reconstruction in the present disclosure.

Therefore, in the present disclosure, in order to overcome the Markov property of the observation model, a Gaussian process with spatial correlation is introduced to reconstruct the Bayes filtering framework, as shown in FIG. 12. FIG. 12 is a reconstructed Bayes filtering framework in the present disclosure, and a box-circled part is added to the figure for representing the modeling of spatial-temporal correlation, which can represent the correlation between the current observation value of the robot and the past observation and control information, thereby improving the accuracy of robot positioning. Specifically, in the present disclosure, a Gaussian process observation model is introduced into GP-Localize. The GP-Localize algorithm can perform spatially dependent field measurements during robot motion, and GP-Localize is the prior art and thus will not be described in detail herein. GP-Localize can solve the Markov hypothesis, reduce the memory and time complexity of the third power due to an inverse matrix of a covariance calculated by the Gaussian process, and realize the time and memory of a constant term. By extending to visual high-dimensional data by using Bayes filtering and based on the GP-Localize algorithm of the Gaussian process, the present disclosure can maintain the time and memory complexity of the GP-Localize constant term level, and is very suitable for real-time robot positioning. Moreover, a sensing device of a camera is mounted, which is beneficial to further promotion and commercialization.

Meanwhile, high-dimensional visual data of an outdoor environment can be established through the dimensional processing of the shot surrounding environment image information, which makes the positioning more intelligent. And in an on-line processing manner, the Bayes filtering framework is reconstructed, and a real initial position point is endowed to the current trajectory. The initial position point of the current trajectory is a first position point of the current trajectory positioned by the GPS, and the first position point may be obtained by averaging multiple repeated sampling. Then the Bayes filtering process may be executed by inputting other adjustment parameters, and all the position points on the current trajectory may be iterated continuously, so that the robot can provide accurate navigation for its own motion. It will be understood that the prediction of position points by Bayes filtering is the prior art and will not be described in detail herein.

Figure 10:
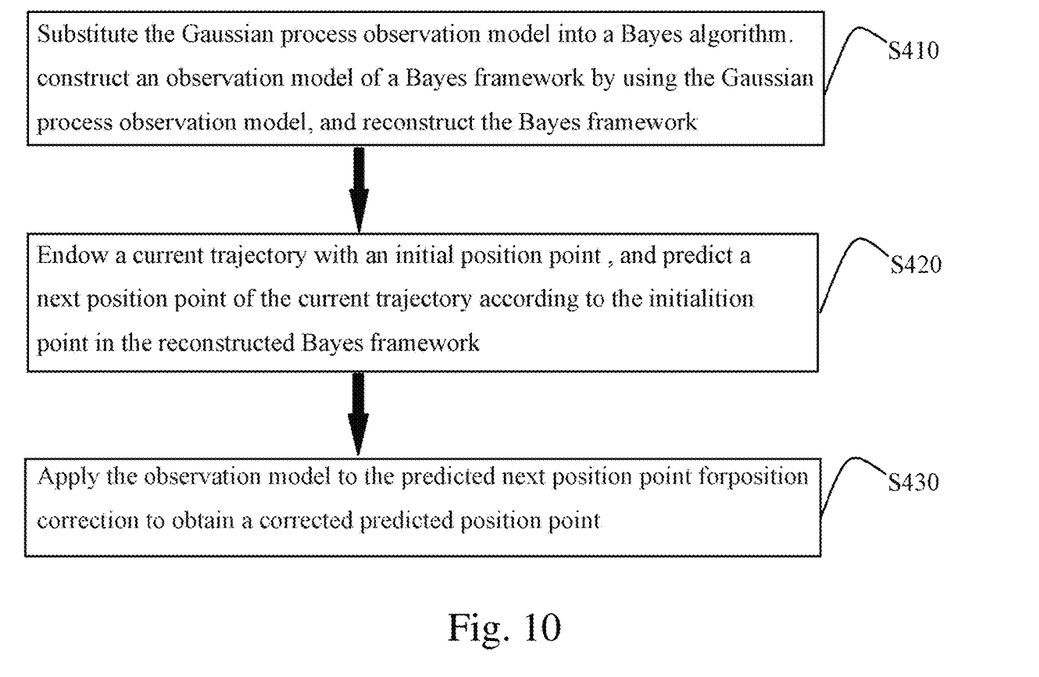
FIG. 10 is a flowchart of a preferred embodiment of predicting a position point and correcting the predicted position point by a reconstructed Bayes filtering framework in step S400 of FIG. 1.

In a specific embodiment, as shown in FIG. 10, the step of predicting a position point and correcting the predicted position point by a reconstructed Bayes filtering framework includes the following steps.

At S410, the Gaussian process observation model is substituted into a Bayes algorithm, an observation model of a Bayes filtering framework is constructed by using the Gaussian process observation model, and the Bayes filtering framework is reconstructed.

At S420, a current trajectory is endowed with an initial position point, and a next position point of the current trajectory is predicted according to the initial position point in the reconstructed Bayes filtering framework.

At S430, the observation model is applied to the predicted next position point for position correction to obtain a corrected predicted position point.

Specifically, when the robot moves in an unknown environment, control u=(relative distance, relative angle) of current time t is input. Meanwhile, the robot collects observation value z of a surrounding environment, and observation information about the environment of the robot at time t is composed of relative distance and angle measurements of m road signs.

Meanwhile, a robot pose and all observed road sign positions in a coordinate system are estimated, that is, the state of the whole system composed of the robot and the environmental road signs is estimated, and the expression is: Bel($x_t$)=p($x_t|z_{1:t},u_{1:t}$), called belief, and the estimation mode is divided into two parts: t is calculated for a prior distribution before observation:
$\overline{bel}(x_t)=\int p(x_t|x_{t-1},u_t)bel(x_{t-1})dx_{t-1}$, where $p(x_t|x_{t-1},u_t)$ is called a motion model; the distribution is updated by a Bayes formula according to observation at time t to obtain a posterior distribution: bel($x_t$)=$\eta p(z_t|x_t)\overline{bel}(x_t)$, where $p(z_t|x_t)$ is called an observation model.

In the observation model, a Bayes filter imposes a given Markov property to maintain the efficiency. At current position $X_t$ of the efficient robot, current measurement value $Z_t$ is conditionally independent of the past behavior $u_{1:t}=(u_1, \ldots ; u_t)^T$, and it is measured that $z_{1:t}=(z_1; \ldots ; z_t)^T$, which may be represented as: $p(z_t|x_t,u_{1:t},z_{1:t-1})$.

By introducing a Gaussian in the Bayes framework, the present disclosure has a process of obtaining GP-Localize:

It is assumed that X is a set of positions, and $z_x$ or $Z_x$ is associated. Each position $x \in \chi$ represents observation. If x is observed or not observed, although not observation of $\{Z_x\}_x \in$ also represents a GP, and subsets of each finite $\{Z_x\}_x \in$ have a multivariate Gaussian distribution. Each GP has the characteristics of average $\mu_x$=E[$Z_x$] and covariance $\sigma_{xx'}$=cov[$Z_x,Z_{x'}$]. For all x, x'$\in$, and the latter represents a relevant structure of a spatial domain. An expression for an observation result distribution not observed using Gaussian prediction is: $p(z_x|x,S,z_S)=N(\mu_S,\sigma_{xx|S})$ Under the framework of a Bayes filter, the observation of the Markov property is relaxed to consider obtaining all historical data by marginalizing random positions until time step t-1, and the robot has accessed:

$$p(z_t|x_t,u_{1:t},z_{1:t-1}) = \eta \int b(x_0) \prod_{i=1}^{t} p(x_i|u_i,x_{i-1})p(z_t|x_t,x_{1:t-1},z_{1:t-1})dx_{0:t-1},$$

where b($x_0$)=p($x_0$) is belief time step 0 of an initial position of the robot, and $\eta=1/p(x_t|u_{1:t},z_{1:t-1})$ is a normalization constant. Assuming that the robot has visited and observed a set of positions $x_{1:t-1}=x_1, \ldots, x_{t-1}$, a Gaussian prediction distribution $p(z_t|x_t,x_{1:t-1},z_{1:t-1})$~N($\mu_{x_t}|x_{1:t-1},\sigma_{x_tx_t}|x_{1:t-1}$) is obtained until time step t-1.

By replacing the observation model with a Markov hypothesis, an improved observation model is present in the Bayes filter, and GP-Localize can achieve constant time and memory, which is very suitable for persistent robot positioning.

And then a global feature and a semantic feature are added to the above expression to obtain a corresponding expression: $p(C_t|x_t,x_{1:t-1},C_{1:t-1})=N_C(\mu_{x_t}|x_{1:t-1},\sigma_{x_tx_t}|x_{1:t-1})$ where $C_t=\{G_t,S_t\}$ is a combination of global and semantic features. According to the above formula, a provided multivariate Gaussian prediction distribution GVSGP may be obtained. Since a term $p(z_t|x_t,x_{1:t-1},z_{1:t-1})$ in the integral is not calculable by the formula, Monte Carlo is used to integrate the observation model, and an integrated expression is:

$$p(z_t|x_t,u_{1:t},z_{1:t-1}) \approx \frac{1}{C}\sum_{c=1}^{C} p(z_t|x_t,x_{1:t-1}^c,z_{1:t-1})dx_{0:t-1},$$

where $x_{1:t-1}^c$ represents an observation model used to correct a motion model. By means of a multivariate Gaussian prediction probability $p(z_t|x_t,x_{1:t-1}^c,z_{1:t-1})$, $C_t=\{G_t,S_t\}$ may be effectively obtained, that is, corresponding observation value z may be obtained according to current state/position point x from a trained Gaussian process.

A motion model at the current moment is established, a next position point of the current trajectory is predicted through the motion model, and the observation model formed by the above Gaussian process observation model is applied to the predicted next position point for position correction. The correction expression is: bel($x_t$)=$\eta p(z_t|x_t)\overline{bel}(x_t)$, where p($z_t|x_t$) is the formula of the observation model. Thus, by means of the acquired prediction value, a Gaussian prediction probability $p(z_t|x_t,x_{1:t-1}^c,z_{1:t-1})$ may be calculated.

By introducing the Gaussian process into the observation model for modeling, a final formula is derived as follows:

$$p(z_t|x_t,u_{1:t},z_{1:t-1}) = \eta \int b(x_0) \prod_{i=1}^{t} p(x_i|u_i,x_{i-1})p(z_t|x_t,x_{1:t-1}^c,z_{1:t-1})dx_{0:t-1},$$

where $p(z_t|x_t,x_{1:t-1}^c,z_{1:t-1})$ is a new observation model.

Bayes filtering not only utilizes visual information, but also utilizes a positioning sensor of the robot for positioning. The Gaussian process is introduced into GP-Localize to establish the observation model, and then the accurate navigation of the robot is achieved by mapping. Compared with the ORBSLM system, ORBSLM has high local accuracy, but worse relevance and sparse environment map relative to the global feature. By combining the global feature and the semantic feature, the present disclosure not only facilitates the processing of the Gaussian process, but also can be better used for robot positioning since the semantic feature can be used for semantic segmentation identification in the later stage, and has strong practicality.

In a specific embodiment, after step S430, the method includes the following step.

A next position point is continuously predicted with the corrected predicted position point as a current position point.

Through the process of predicting and correcting the position points, the whole trajectory can be predicted and the robot can be accurately positioned and navigated.

Figure 13:
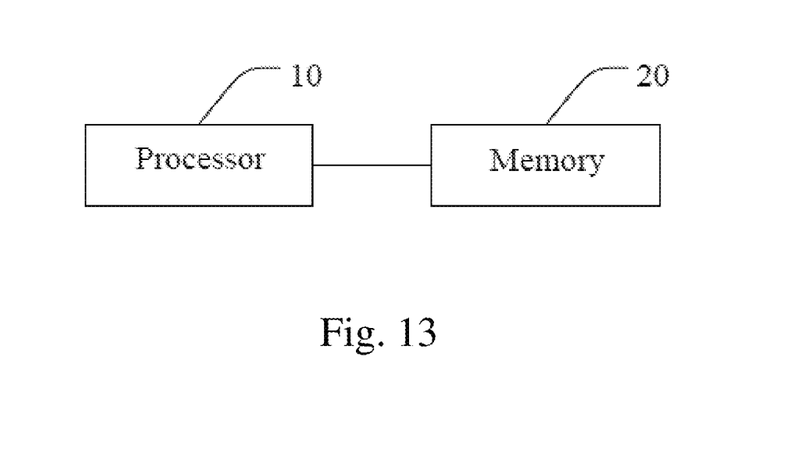
FIG. 13 is a functional schematic block diagram of a preferred embodiment of a system in the present disclosure.

The present disclosure also discloses a system, as shown in FIG. 13, including a memory 20, and one or more programs. The one or more programs are stored in the memory 20 and configured to be executed by one or more processors 10 to perform the visual positioning method based on the Gaussian process described above. The specific content is as described above.

Figure 14:
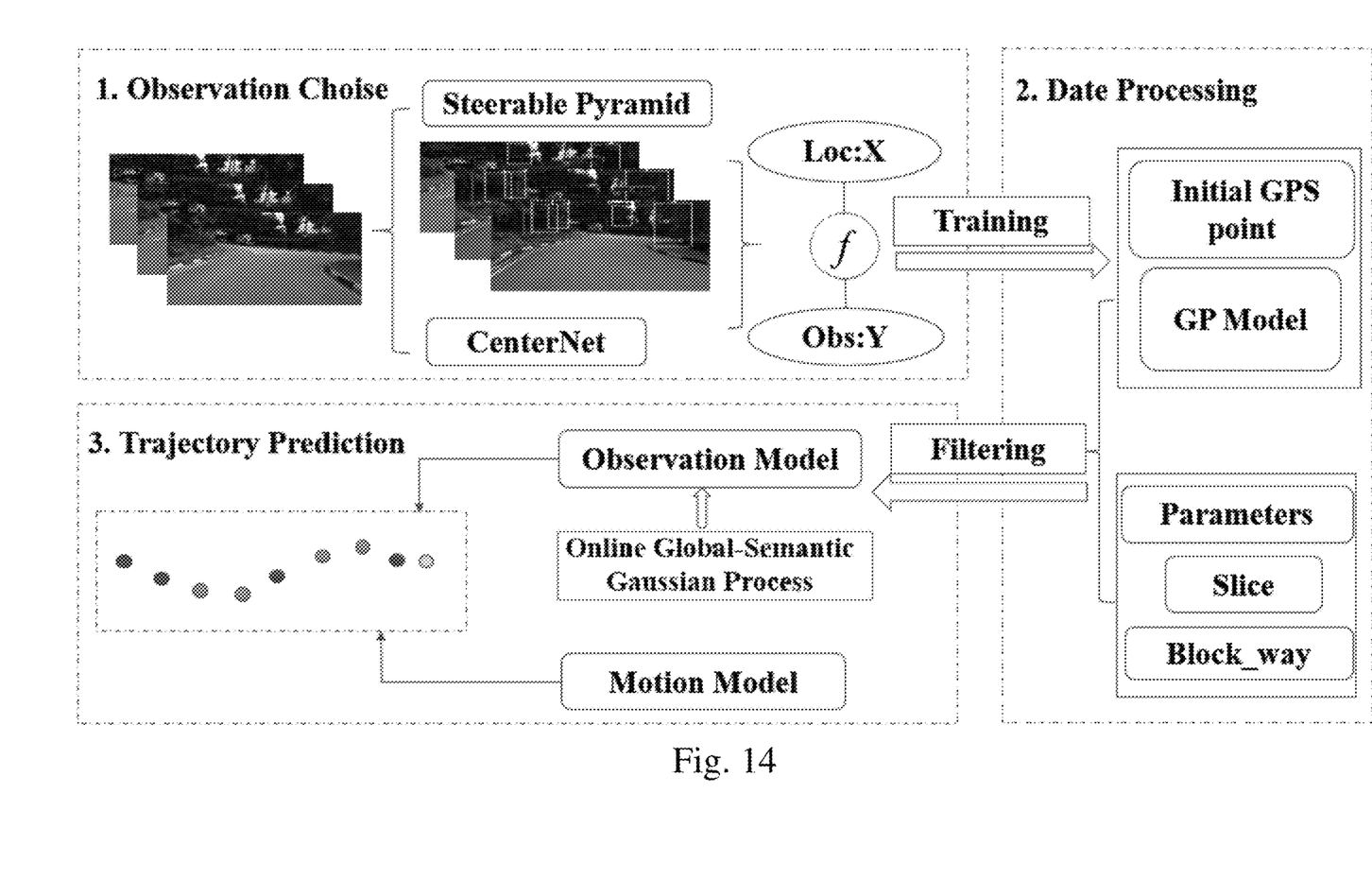
FIG. 14 is a functional schematic block diagram of a specific embodiment of a system in the present disclosure.

As shown in FIG. 14, the system of the present disclosure performs the following steps in operation:

In the first step, selection of an observation value (observation choice) is performed: selecting a semantic feature (steerable pyramid) and a global feature (centernet) of a surrounding environment, and then expressing a trajectory point by x (loc: X) and an observation value by y (obs: Y) to obtain a feature matrix.

In the second step, conversion of a Gaussian process (date processing) is performed. The feature matrix is input into a Gaussian model (GP Model). Combined with an actual initial point (Initial GPS), a Gaussian process observation model is obtained by inputting a series of parameters (parameters, slice, block-way, etc.).

In the third step, the obtained Gaussian process observation model is substituted into a Bayes framework for trajectory prediction. A motion model is used for trajectory prediction, and an observation model is used for trajectory correction. The observation model is created on line through an online global-semantic gaussian process observation model.

The present disclosure also discloses a storage medium, storing a computer program that can be executed for implementing the visual positioning method based on the Gaussian process described above. The specific content is as described above.

In summary, the present disclosure discloses a visual positioning method and system based on a Gaussian process, and a storage medium. The method includes: collecting image information of a surrounding environment and moving trajectory points while traveling; extracting global features and semantic features in the collected image information; processing the extracted global features and semantic features and the moving trajectory points according to a preset processing rule to obtain a Gaussian process observation model; and reconstructing a Bayes filtering framework according to the Gaussian process observation model, endowing a current trajectory with an initial position point, and generating a next position point of the current trajectory through the reconstructed Bayes filtering framework. An association between a current state and a historical state can be established, so that the accuracy of a predicted next position point is improved, and accurate navigation can be provided for a robot motion.

It should be understood that the application of the present disclosure is not limited to the above examples. For those of ordinary skill in the art, improvements or changes may be made based on the above description, and all these improvements and changes should fall within the protection scope of the appended claims of the present disclosure.

The invention claimed is:

1. A visual positioning method based on a Gaussian process, comprising:
   collecting image information of a surrounding environment and moving trajectory points while traveling;
   extracting global features and semantic features in the collected image information;
   processing the extracted global features and semantic features and the moving trajectory points according to a preset processing rule to obtain a Gaussian process observation model;
   reconstructing a Bayes filtering framework according to the Gaussian process observation model, endowing a current trajectory with an initial position point, and generating a next position point of the current trajectory through the reconstructed Bayes filtering framework, the next position point being used for providing a positioning guidance for navigation; and
   controlling a vehicle to traverse the current trajectory;
   wherein the manners of extracting global features and semantic features in the collected image information respectively are:
   extracting dimensions of global features in the collected image information through a Steerable Pyramid algorithm; and
   extracting a maximum probability value of different categories of things in each collected picture through CenterNet algorithm semantics.

2. The visual positioning method based on the Gaussian process according to claim 1, wherein the reconstructing a Bayes filtering framework according to the Gaussian process observation model, endowing a current trajectory with an initial position point and generating a next position point of the current trajectory through the reconstructed Bayes filtering framework specifically comprises:
   substituting the Gaussian process observation model into a Bayes algorithm, constructing an observation model of a Bayes filtering framework by using the Gaussian process observation model, and reconstructing the Bayes filtering framework;
   endowing a current trajectory with an initial position point, and predicting a next position point of the current trajectory according to the initial position point in the reconstructed Bayes filtering framework; and
   applying the observation model to the predicted next position point for position correction to obtain a corrected predicted position point.

3. The visual positioning method based on the Gaussian process according to claim 2, wherein, after the applying the observation model to the predicted next position point for position correction to obtain a corrected predicted position point, comprising:
   continuing to predict a next position point with the corrected predicted position point as a current position point.

4. The visual positioning method based on the Gaussian process according to claim 1, wherein the processing the extracted global features and semantic features and the moving trajectory points according to a preset processing rule to obtain a Gaussian process observation model specifically comprises:
   compressing the extracted dimensions of the global features to non-repetitive minimum dimensions;
   establishing a dimension for the maximum probability value of semantic extraction according to categories of things respectively;
   combining the dimensions corresponding to the extracted global features and semantic features into an eigenvalue matrix; and
   establishing and training a corresponding relationship between the eigenvalue matrix and collected trajectory points, and outputting the Gaussian process observation model representing a spatial relationship between eigenvalues and trajectory points.

5. The visual positioning method based on the Gaussian process according to claim 4, wherein the establishing and training a corresponding relationship between the eigenvalue matrix and collected trajectory points and outputting the Gaussian process observation model representing a spatial relationship between eigenvalues and trajectory points specifically comprises:
   training a Gaussian process by taking a trajectory point as an X value and an eigenvalue as a Y value, and establishing a relationship between the eigenvalue and the trajectory point to obtain a Gaussian process observation model.

6. The visual positioning method based on the Gaussian process according to claim 1, wherein the collecting image information of a surrounding environment and moving trajectory points while traveling specifically comprises:
   enabling a camera to take an image of the surrounding environment while traveling; and
   positioning trajectory points moving while traveling by a GPS, and randomly collecting the trajectory points positioned by the GPS.

7. The visual positioning method based on the Gaussian process according to claim 1, wherein the initial position point of the current trajectory is a first position point of the current trajectory positioned by the GPS.

8. A visual positioning system based on a Gaussian process, comprising a memory, and one or more programs, wherein the one or more programs are stored in the memory and configured to be executed by one or more processors to perform the visual positioning method based on the Gaussian process of claim 1.

9. A non-transitory computer readable storage medium, wherein the storage medium stores a computer program that can be executed for implementing the visual positioning method based on the Gaussian process of claim 1.

* * * * *